United States Patent
You et al.

(10) Patent No.: US 9,077,974 B2
(45) Date of Patent: Jul. 7, 2015

(54) 3D VIDEO-TELECONFERENCING APPARATUS CAPABLE OF EYE CONTACT AND METHOD USING THE SAME

(75) Inventors: Bum-Jae You, Seoul (KR); Eun-Kyung Lee, Daejeon (KR); Ji-Yong Lee, Seoul (KR); Jai-Hi Cho, Seoul (KR); Shin-Young Kim, Gyeonggi-do (KR)

(73) Assignee: CENTER OF HUMAN-CENTERED INTERACTION FOR COEXISTENCE, Seoul (KR)

( * ) Notice: Subject to any disclaimer, the term of this patent is extended or adjusted under 35 U.S.C. 154(b) by 83 days.

(21) Appl. No.: 13/885,998

(22) PCT Filed: Jul. 6, 2012

(86) PCT No.: PCT/KR2012/005371
§ 371 (c)(1),
(2), (4) Date: May 16, 2013

(87) PCT Pub. No.: WO2013/187551
PCT Pub. Date: Dec. 19, 2013

(65) Prior Publication Data
US 2014/0218467 A1     Aug. 7, 2014

(30) Foreign Application Priority Data
Jun. 11, 2012 (KR) ........................ 10-2012-0062200

(51) Int. Cl.
*H04N 7/14* (2006.01)
*H04N 13/02* (2006.01)

(52) U.S. Cl.
CPC ........... *H04N 13/0203* (2013.01); *H04N 7/142* (2013.01); *H04N 7/144* (2013.01); *H04N 13/0239* (2013.01); *H04N 13/0271* (2013.01)

(58) Field of Classification Search
USPC ....................................... 348/14.16
See application file for complete search history.

(56) References Cited

U.S. PATENT DOCUMENTS 6,771,303 B2     8/2004 Zhang
6,806,898 B1 *   10/2004 Toyama et al. ............ 348/14.16
(Continued)

FOREIGN PATENT DOCUMENTS

| JP | H09-154114 | 6/1997 |
| JP | 2000-165834 | 6/2000 |

(Continued)

OTHER PUBLICATIONS

Sang-Beom Lee et al., "Real-time Eye Contact System Using a Kinect Depth Camera for Realistic Telepresence," Journal of KICS, 2012.
(Continued)

*Primary Examiner* — Amal Zenati
(74) *Attorney, Agent, or Firm* — Wells St. John P.S.

(57) ABSTRACT

Disclosed herein is a 3D teleconferencing apparatus and method enabling eye contact. The 3D teleconferencing apparatus enabling eye contact according to the present invention includes an image acquisition unit for acquiring depth images and color images by manipulating cameras in real time in consideration of images obtained by capturing a subject that is a teleconference participant and images received over a network and corresponding to a counterpart involved in the teleconference; a full face generation unit for generating a final depth image and a final color image corresponding to a full face of the participant for eye contact using the depth images and the color images; and a 3D image generation unit for generating a 3D image corresponding to the counterpart and displaying the 3D image on a display device.

13 Claims, 7 Drawing Sheets

(56) References Cited

U.S. PATENT DOCUMENTS 6,831,676 B2 * 12/2004 Monroe .................. 348/14.08
2003/0197779 A1 10/2003 Zhang

FOREIGN PATENT DOCUMENTS

| | | |
|---|---|---|
| JP | 2001-313917 | 11/2001 |
| JP | 2006-101472 | 4/2006 |
| JP | 2008-228170 | 9/2008 |
| JP | 2010-117152 | 5/2010 |
| JP | 2011-077780 | 4/2011 |
| JP | 2011-130234 | 6/2011 |
| JP | 2011-248466 | 8/2011 |
| KR | 10-1997-0057779 | 7/1997 |
| KR | 10-0691348 | 3/2007 |
| KR | 10-2010-0028725 | 3/2010 |
| KR | 10-2011-0032429 | 3/2011 |

OTHER PUBLICATIONS

JP Office Action, English Translation, Japanese Patent Application No. 2014-521546, Sep. 24, 2014.

JP Office Action, Japanese Patent Application No. 2014-521546, Sep. 24, 2014.

* cited by examiner

3D VIDEO-TELECONFERENCING APPARATUS CAPABLE OF EYE CONTACT AND METHOD USING THE SAME

CROSS REFERENCE TO RELATED APPLICATION

This is a 35 U.S.C. §371 application of, and claims priority to, International Application No. PCT/KR2012/005371, which was filed on Jul. 6, 2012, which claims priority to Korean Patent Application No. KR 10-2012-0062200, which was filed on Jun. 11, 2012, the entirety of all the applications are incorporated herein by reference.

TECHNICAL FIELD

The present invention relates, in general, to a three-dimensional (3D) teleconferencing system and, more particularly, to a teleconferencing system and a method using the system, in which two conference participants remotely located at different places can keep eye contact with each other while looking at the 3D full face of the opposite party, and can interact with each other in real time. This application claims the benefit of Korean Patent Application No. 10-2012-0062200, filed on Jun. 11, 2012, which is hereby incorporated by reference in its entirety into this application.

BACKGROUND ART

Recently, as multimedia communication services become popularized, teleconferencing systems that allow a participant to have a conversation with a counterpart, located at a remote place, face to face have been widely used. Such a teleconferencing system allows a plurality of persons to participate in a conference together, a plurality of regions to be simultaneously connected, and conference information, such as the audio or video of opposite parties, to be transmitted in real time over a network.

Generally, a teleconferencing system is configured such that a camera for capturing a user is installed over, under, or besides a screen, and the line of sight of the user is directed at the screen, so that a captured image of the user shows that the direction of the line of sight of the user does not face straight ahead.

When having a conversation, eye contact is a very important factor in engaging others in the conversation or gaining the trust of the counterpart, but a teleconferencing system that is generally used is problematic in that since the direction of the line of sight displayed on a screen does not face straight ahead, as described above, it is impossible to keep eye contact with the counterpart during the conversation. The problem of it being impossible to keep eye contact when using a teleconferencing system has acted as a fatal limitation in the actualization of teleconferencing systems, and it is one of the main contributing factors to the awkwardness that many users experience when participating in a teleconference conversation.

U.S. Pat. No. 6,771,303 presents technology for allowing participants in a video conference to align their lines of sight with one another by installing two cameras over and under a monitor upon initiating a video conference, calculating the depth information of the video conference participants, detecting the positions of heads of the participants, and generating light-of-sight images suitable for the current locations of the participants. U.S. Pat. No. 6,806,898 presents technology for allowing a current participant in a teleconference to keep eye contact with a counterpart involved in the teleconference by analyzing the position and direction of the head of the current teleconference participant via a camera installed over a monitor and by synthesizing the pupils of the eyes so that the eyes of the current participant look straight ahead.

Further, Korean Patent Application Publication No. 1997-0057779 discloses technology for generating three-dimensional (3D) images to be displayed to individual conference participants using three cameras and displaying the 3D images in three dimensions. Korean Patent Application Publication No. 2010-0028725 discloses technology for enabling only a light-receiving unit to be separately movable in an eye-contact camera, thus adaptively making eye contact even if a counterpart is not displayed at the center of a monitor.

However, such conventional eye contact-supporting technologies for a teleconferencing system merely disclose simple image acquisition via simple movement in which only a fixed camera location or the location of the counterpart on the screen is taken into consideration so as to acquire eye contact images, and does not present detailed technology related to factors that must be taken into consideration to acquire an optimal eye contact image and related to which scheme is to be used to manipulate the camera in consideration of the factors. Further, most conventional technologies adopt a technique for generating depth information by calculating real-time depth, so that there is a problem in that the accuracy of depth information is not guaranteed, thus making it difficult to generate natural images. Furthermore, the conventional technologies are technologies limited to a scheme in which participants conduct a conference while simply viewing images, and do not describe real-time interaction for more realistic teleconferencing.

Therefore, there is urgently required new 3D teleconferencing technology that provides optimal eye contact images by presenting factors to be taken into consideration so as to generate realistic eye contact images, suitably utilizing these factors, and manipulating cameras, and that enables real-time interaction for a more realistic teleconference and is capable of generating more accurate and realistic images using depth information acquired by depth cameras.

DISCLOSURE

Technical Problem

An object of the present invention is to define factors that must be taken into consideration to capture realistic eye contact images even when a teleconference participant stands and conducts the teleconference or changes his or her position, and to manipulate cameras by suitably utilizing these factors, thus enabling the teleconference to be naturally conducted as if teleconference participants were actually located in the same space.

Another object of the present invention is to actualize a teleconferencing system by allowing teleconference participants to feel as if they are actually conducting a conference in the same space, via real-time interaction during a 3D teleconference.

A further object of the present invention is to provide a 3D teleconferencing system, which solves the problem of accuracy caused by the real-time calculation of 3D depth information, thus generating more realistic images.

Yet another object of the present invention is to provide a more realistic teleconferencing system by normalizing 3D depths differently felt by individual users using a test pattern and generating 3D images in consideration of normalized results.

Technical Solution

A three-dimensional (3D) teleconferencing apparatus enabling eye contact according to the present invention to accomplish the above objects includes an image acquisition unit for acquiring depth images and color images by manipulating cameras in real time in consideration of images obtained by capturing a subject that is a teleconference participant and images received over a network and corresponding to a counterpart involved in the teleconference; a full face generation unit for generating a final depth image and a final color image corresponding to a full face of the participant for eye contact using the depth images and the color images; and a 3D image generation unit for generating a 3D image corresponding to the counterpart and displaying the 3D image on a display device.

In this case, the image acquisition unit may manipulate the cameras in real time by means of a pan operation of horizontally rotating the individual cameras in left/right directions, a tilt operation of vertically rotating the individual cameras in up/down directions, and a height operation of vertically moving the individual cameras in up/down directions.

In this case, the image acquisition unit may be configured to perform the pan operation of the cameras based on the captured images, perform the tilt operation of the cameras using both the captured images and the images of the counterpart, and perform the height operation of the cameras based on the images of the counterpart.

In this case, the image acquisition unit may be configured to perform the pan operation of the cameras based on positions of eyes of the participant detected from the captured images, perform the tilt operation of the cameras based on a difference between the positions of the eyes of the participant and positions of eyes of the counterpart detected in the images of the counterpart, and perform the height operation of the cameras based on an eye level of the counterpart.

In this case, the 3D teleconferencing apparatus enabling eye contact may further include a gesture recognition unit for determining whether the participant has conducted a preset action, using the captured images; and a gesture processing unit for performing a function corresponding to the preset action.

In this case, the gesture processing unit may be configured to, if the preset action is determined to be an interactive action, provide an interactive feedback.

In this case, the interactive feedback may be a visual feedback in which an image indicating a part of a body of the participant corresponding to the interactive action is added to the 3D image.

In this case, the 3D image generation unit may measure a perceived 3D depth of the participant based on a reaction of the participant to a 3D test image provided to the participant, and generate the 3D image in consideration of the perceived 3D depth.

In this case, the cameras may be provided to be integrated into the display device.

In this case, the cameras may be independently provided outside the display device.

In this case, the full face generation unit may perform depth noise elimination and depth correction on the depth images, perform color correction on the color images, and then generate a single final depth image and a single final color image.

In this case, the 3D image generation unit may reconstruct a 3D mesh image corresponding to the counterpart by performing mesh hole-filling on the final depth image and the final color image corresponding to the counterpart, and generate a 3D image corresponding to the counterpart by using the 3D mesh image.

Further, a three-dimensional (3D) teleconferencing method enabling eye contact according to an embodiment of the present invention includes acquiring depth images and color images by manipulating pan, tilt, and height of cameras in real time in consideration of images obtained by capturing a subject that is a teleconference participant and images received over a network and corresponding to a counterpart involved in the teleconference; generating a final depth image and a final color image corresponding to a full face of the participant for eye contact using the depth images and the color images; and generating a 3D image corresponding to the counterpart and displaying the 3D image on a display device.

In this case, acquiring the depth images and the color images may be configured to perform the pan operation of the cameras based on positions of eyes of the participant detected from the captured images, perform the tilt operation of the cameras based on a difference between the positions of the eyes of the participant and positions of eyes of the counterpart detected in the images of the counterpart, and perform the height operation of the cameras based on an eye level of the counterpart.

In this case, the 3D teleconferencing method enabling eye contact may further include determining whether the participant has conducted a preset action, using the captured images; and performing a function corresponding to the preset action.

In this case, performing the function corresponding to the preset action may be configured to, if the preset action is determined to be an interactive action, provide a visual feedback in which an image indicating a part of a body of the participant corresponding to the interactive action is added to the 3D image.

In this case, displaying on the display device may be configured to measure a perceived 3D depth of the participant based on a reaction of the participant to a 3D test image provided to the participant, and generate the 3D image in consideration of the perceived 3D depth.

Advantageous Effects

According to the present invention, even when a relevant teleconference participant stands and conducts a teleconference or changes his or her position, a camera suitably tracks the participant, thus enabling the teleconference to be naturally conducted as if teleconference participants were actually located in the same space.

Further, the present invention can actualize a teleconferencing system by allowing teleconference participants to feel as if they are actually conducting a conference in the same space, via real-time interaction, such as shaking hands or giving high-fives, during a 3D teleconference.

Furthermore, the present invention can solve the problem of accuracy caused by the real-time calculation of 3D depth information, thus generating more realistic 3D images.

Furthermore, the present invention can enable a more realistic teleconference to be conducted by normalizing 3D depths differently felt by individual users using a test pattern and generating 3D images in consideration of normalized results.

BEST MODE

Figure 1:
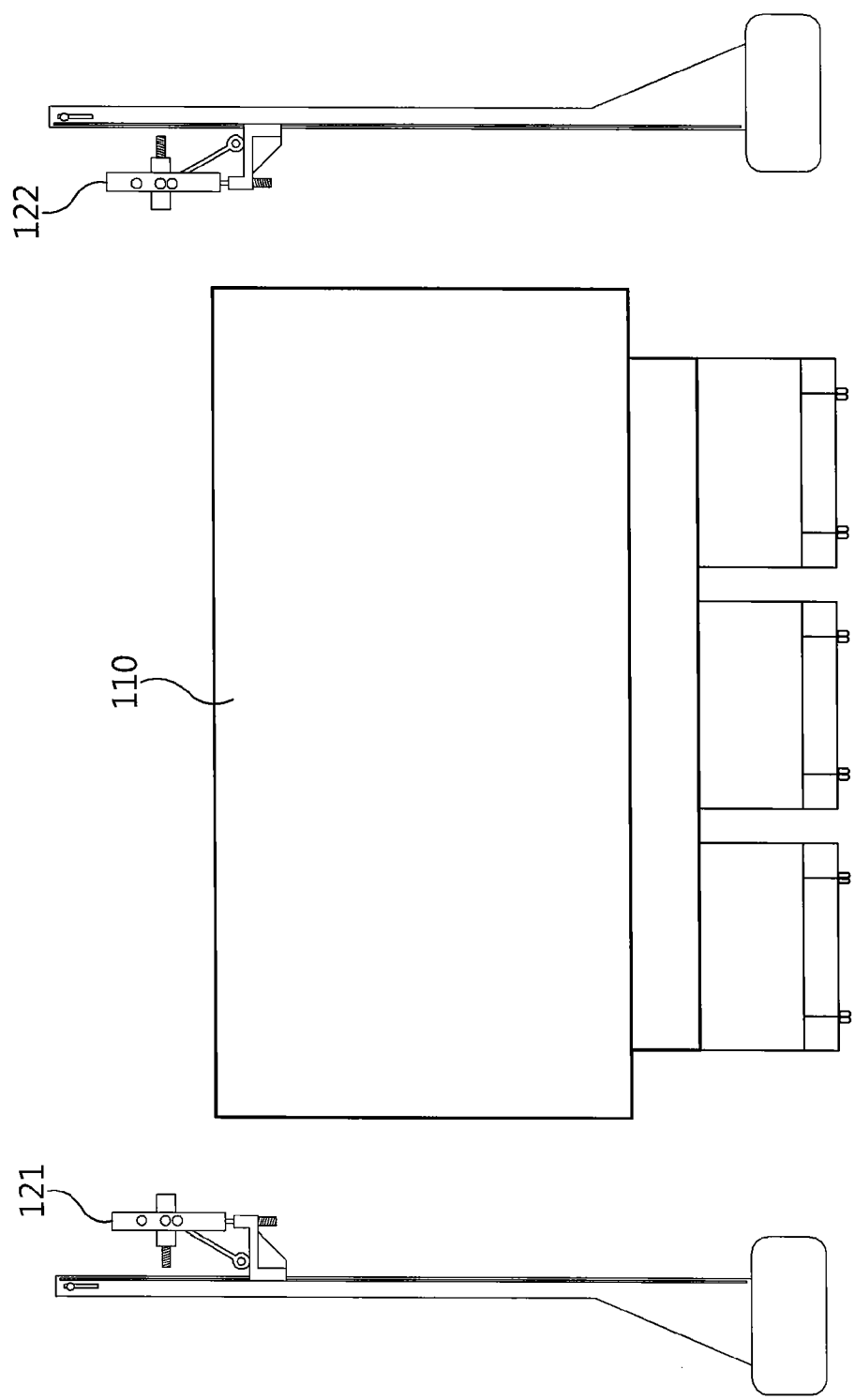
FIG. 1 is a diagram showing an example of a system to which a 3D teleconferencing apparatus enabling eye contact according to the present invention is applied.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

FIG. 1 is a diagram showing an example of a system to which a 3D teleconferencing apparatus enabling eye contact according to the present invention is applied.

Referring to FIG. 1, a 3D teleconferencing apparatus enabling eye contact according to the present invention includes a display device 110 for displaying a 3D image and cameras 121 and 122 for generating eye contact images.

That is, the system shown in FIG. 1 displays a 3D image of a counterpart involved in a teleconference on the display device 110, and captures images of a subject, that is, a teleconference participant, using the cameras 121 and 122. In this case, the cameras 121 and 122 can be rotated and moved to be suitable for the generation of full face stereoscopic images for eye contact in real time.

In this case, each of the cameras 121 and 122 may be a Kinect camera composed of an RGB camera for obtaining color images and an Infrared (IR) camera for generating depth images. As shown in FIG. 1, the cameras 121 and 122 are provided independently of the display device 110, and can be freely rotated and moved in order to track a user so that the full face image of the user for eye contact is suitably generated.

Figure 2:
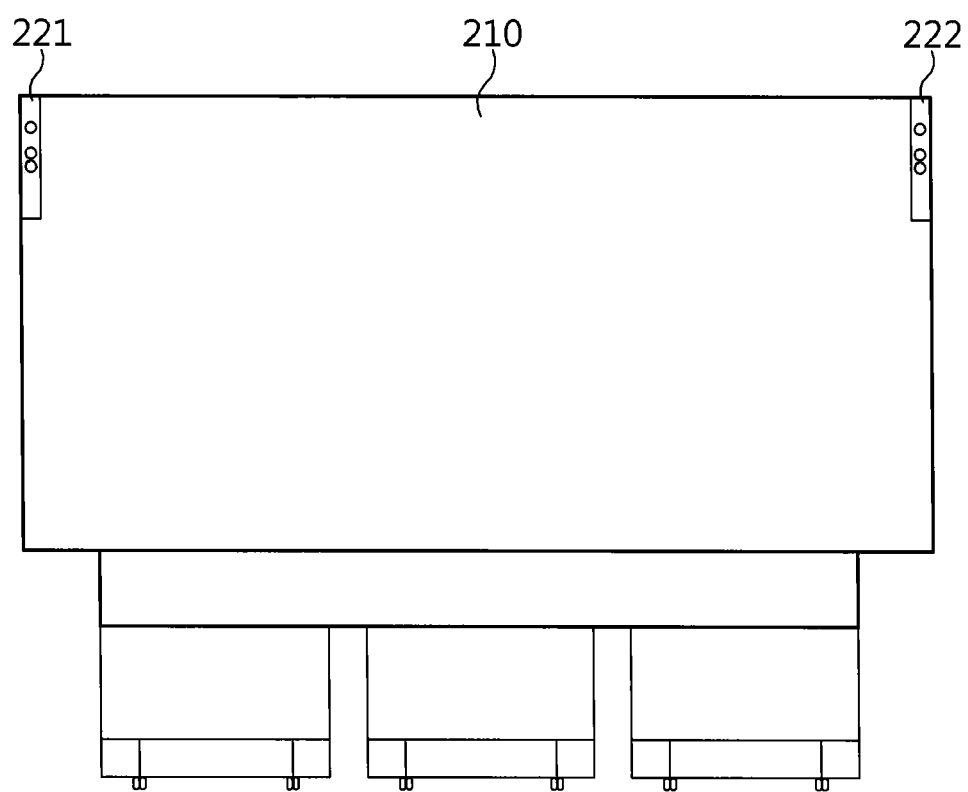
FIG. 2 is a diagram showing another example of a system to which a 3D teleconferencing apparatus enabling eye contact according to the present invention is applied.

FIG. 2 is a diagram showing another example of a system to which the 3D teleconferencing apparatus enabling eye contact according to the present invention is applied.

Referring to FIG. 2, it can be seen that cameras 221 and 222 are installed in a display device 210.

The system shown in FIG. 2 displays a 3D image of a counterpart involved in a teleconference on the display device 210, and captures images of a subject, that is, a teleconference participant, using the cameras 221 and 222. In this case, the cameras 221 and 222 provided to be integrated into the display device 210 can be rotated and moved so that a stereoscopic full face image for eye contact is suitably generated in real time.

In this case, each of the cameras 221 and 222 may be a Kinect camera composed of an RGB camera for obtaining color images and an Infrared (IR) camera for generating depth images.

As shown in FIG. 2, the cameras 221 and 222 are provided to be integrated into the display device 210 and can be freely rotated and moved in order to track a user so that the full face image of the user for eye contact is suitably generated.

Figure 3:
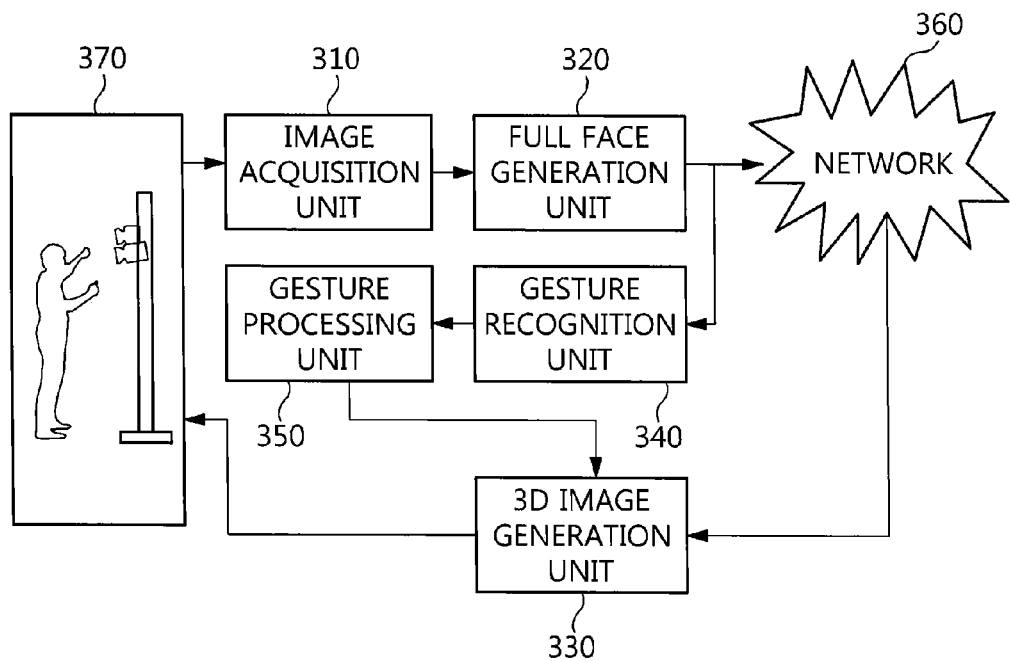
FIG. 3 is a block diagram showing a 3D teleconferencing apparatus enabling eye contact according to an embodiment of the present invention.

FIG. 3 is a block diagram showing a 3D teleconferencing apparatus enabling eye contact according to an embodiment of the present invention.

Referring to FIG. 3, a 3D teleconferencing apparatus enabling eye contact according to an embodiment of the present invention includes an image acquisition unit 310, a full face generation unit 320, a 3D image generation unit 330, a gesture recognition unit 340, and a gesture processing unit 350.

The image acquisition unit 310 manipulates cameras in real time in consideration of images obtained by capturing a subject, that is, a teleconference participant, and images received over a network and corresponding to the counterpart involved in the teleconference, thus acquiring depth images and color images (2C+2D).

In this case, the image acquisition unit 310 may include cameras or may be implemented as a device independent of the cameras.

In this case, the cameras may be two Kinect cameras. In this way, the Kinect cameras including IR cameras for generating depth images are used, so that it is possible to reduce the burden of real-time calculation of depth information and generate more realistic 3D images by means of more accurate depth information.

In this case, the cameras may include RGB cameras for acquiring color images.

Further, the cameras may be any type of cameras capable of simultaneously acquiring color information and depth information, and the scope of the present invention should not be limited by the kind or type of cameras.

The cameras need to move to optimal locations so as to generate full face images that maintain eye contact even when the conference participant stands and conducts the conference or changes his or her position during the conference.

The image acquisition unit 310 can manipulate the cameras in real time by means of a pan operation that horizontally rotates the individual cameras in left/right directions, a tilt operation that vertically rotates the individual cameras in up/down directions, and a height operation that vertically moves the individual cameras in up/down directions.

In this case, the image acquisition unit 310 can perform the pan operation of the cameras based on the images obtained by capturing the teleconference participant, perform the tilt operation using both the images obtained by capturing the teleconference participant and images corresponding to the counterpart, and perform the height operation of the cameras based on the images corresponding to the counterpart.

In more detail, the image acquisition unit 310 may detect the positions of eyes of the corresponding teleconference participant from the images obtained by capturing the participant, and perform the pan operation of the cameras based on the detected eye positions of the participant. In this way, the left/right rotation of the cameras is operated based on the eye positions of the participant, so that images suitable for the synthesis of full face images of the participant can be horizontally captured.

Further, the image acquisition unit 310 may perform the tilt operation based on a difference between the positions of the eyes of the teleconference participant and the positions of the eyes of the counterpart involved in the teleconference. In this way, a situation in which teleconference participants mutually look at each other is reflected by operating the up/down rotation of the cameras based on the difference between the positions of the eyes of the participant and the positions of the eyes of the counterpart, so that even when it is difficult to keep eye contact due to a difference between the heights of the teleconference participants, images suitable for the synthesis of full face images of the participants can be vertically captured.

Furthermore, the image acquisition unit 310 can perform the height operation of the cameras based on the eye level of the counterpart. In this way, the heights of the cameras can be adjusted based on the eye level of the counterpart, thus enabling images that are fitted to the eye level of the actual teleconference participant to be captured.

In this way, in order to maximize realism in the video teleconference, the image acquisition unit 310 moves the locations of the cameras and changes up/down and left/right rotating angles so that the cameras can capture images at positions most similar to the current line of sight of the teleconference participant in consideration of the viewing line of sight of the teleconference participant so as to conduct a realistic teleconference enabling eye contact with the counterpart involved in the teleconference.

The full face generation unit 320 generates a final depth image and a final color image (1C+1D) corresponding to the full face of the participant for eye contact using the depth images and the color images, and transmits the final depth image and the final color image to the counterpart involved in the teleconference over a network 360.

The 3D image generation unit 330 receives a final depth image and a final color image (1C+1D) corresponding to the counterpart involved in the teleconference over the network 360, generates a 3D image corresponding to the counterpart using the final depth and color images, and displays the 3D image on the display device.

In this case, the 3D image generation unit 330 can measure the perceived 3D depth of the participant based on the reaction of the participant to a 3D test image provided to the participant, and generate the 3D image in consideration of the perceived 3D depth. That is, since the depths of the 3D image felt by individual persons differ, the 3D image generation unit 330 provides a test stereoscopic (3D) image to users, measures the depth of the 3D image felt by the corresponding user, and generates the 3D image in consideration of the depth, thus normalizing the 3D image of the teleconferencing system.

The 3D image generation unit 330 can perform mesh hole-filling on the final depth image and the final color image corresponding to the counterpart of the teleconference, reconstruct a 3D mesh image corresponding to the counterpart, and generate a 3D image corresponding to the counterpart using the 3D mesh image.

The gesture recognition unit 340 determines whether the participant has conducted a preset action, using the captured images.

The gesture processing unit 350 performs a function corresponding to the preset action. In this case, the gesture processing unit 350 can provide interactive feedback if it is determined that the preset action is an interactive action. In this case, the interactive feedback may be a visual feedback in which an image of a part of the body of the participant corresponding to the interactive action is added to the 3D image.

For example, the preset action may be handshaking or giving high-fives. For example, the interactive feedback may be a visual feedback in which an image of a part of the hand of the current user who shakes hands with the counterpart, or an image of a part of the hand of the current user who gives high-fives to the counterpart is added to the 3D image corresponding to the counterpart.

In this way, the 3D teleconferencing apparatus enabling eye contact shown in FIG. 3 enables the recognition of gestures of conference participants through the gesture recognition unit 340 and the gesture processing unit 350, thus sharing information in real time during the teleconference, and also enables interactions, such as giving high-fives or shaking hands, between the conference participants, thus maximizing the sense of immersion in the teleconference. Further, the present invention enables real-time operations, such as the reduction/magnification/movement/rotation of virtual objects by recognizing gestures during the teleconference, and also enables interactions between teleconference participants, such as shaking hands or giving high-fives.

Figure 4:
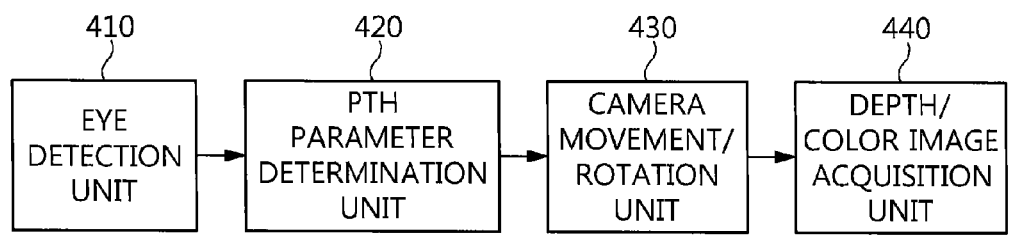
FIG. 4 is a block diagram showing an example of an image acquisition unit shown in FIG. 3.

FIG. 4 is a block diagram showing an example of the image acquisition unit shown in FIG. 3.

Referring to FIG. 4, the image acquisition unit 310 shown in FIG. 3 includes an eye detection unit 410, a PTH parameter determination unit 420, a camera movement/rotation unit 430, and a depth/color image acquisition unit 440.

The eye detection unit 410 can detect the positions of the eyes of a participant in a teleconference to acquire eye contact images, and manipulate the cameras in consideration of the eye level of the participant and the eye level of a counterpart involved in the teleconference.

The PTH parameter determination unit 420 determines parameters for pan, tilt, and height operations in consideration of the positions of the eyes of the conference participant detected by the eye detection unit 410 and the positions of the eyes of the counterpart involved in the conference.

The camera movement/rotation unit 430 manipulates the cameras using the parameters for the pan, tilt, and height operations determined by the PTH parameter determination unit 420. By means of such manipulation, even when the conference participant freely moves during the conference, images can be acquired at the position most similar to the line of sight of the conference participant while the location of the participant is suitably tracked.

The depth/color image acquisition unit 440 generates depth images and color images (2C+2D) from the cameras at an optimal position for eye contact between the conference participants through the camera movement/rotation unit 430.

Figure 5:
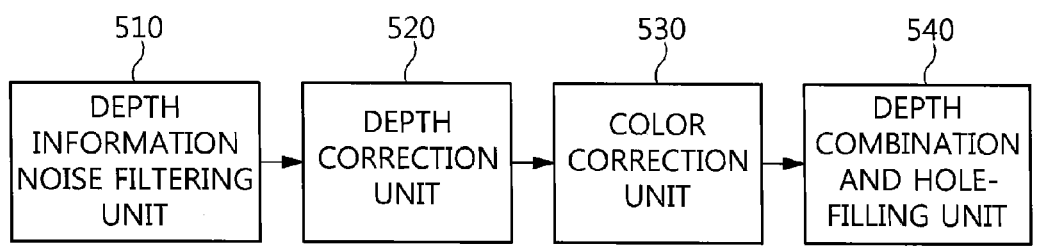
FIG. 5 is a block diagram showing an example of a full face generation unit shown in FIG. 3.

FIG. 5 is a block diagram showing an example of the full face generation unit shown in FIG. 3.

Referring to FIG. 5, the full face generation unit 320 shown in FIG. 3 includes a depth information noise filtering unit 510, a depth correction unit 520, a color correction unit 530, and a depth combination and hole-filling unit 540.

The full face generation unit shown in FIG. 5 executes an algorithm for generating a 3D full face image using the images acquired by the two cameras so as to keep eye contact between teleconference participants.

The depth information noise filtering unit 510 eliminates depth noise from acquired depth images.

The depth correction unit 520 corrects the depth error of depth cameras.

The color correction unit 530 performs color correction so as to adjust a difference between the colors of the images acquired at the different locations.

The depth merging and hole-filling unit 540 performs depth merging and hole-filling, generates full face images of the conference participant, and then provides the full face images as a single final depth image and a single final color image (1D+1C). The single final depth image and the single final color image are resulting images obtained by generating full faces so that the individual conference participants can make eye contact with each other. The final depth image and the final color image generated in this way can be transmitted to the counterpart in real time by executing image compression at a middleware step.

Figure 6:
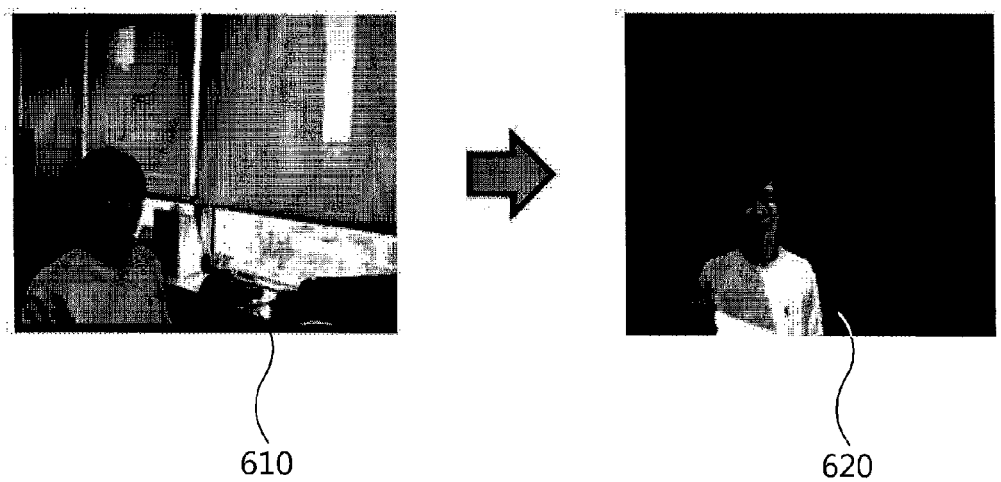
FIG. 6 is a diagram showing an example of full face generation for eye contact.

FIG. 6 is a diagram showing an example of generation of a full face for eye contact.

Referring to FIG. 6, it can be seen that an image 610 captured by a camera is generated as a full face (a front face image) by the 3D image generation unit. The 3D image generation unit captures images by automatically moving the camera to a suitable location depending on the motion of the teleconference participant, and generates a front face image corresponding to the location of the participant using the captured images.

Figure 7:
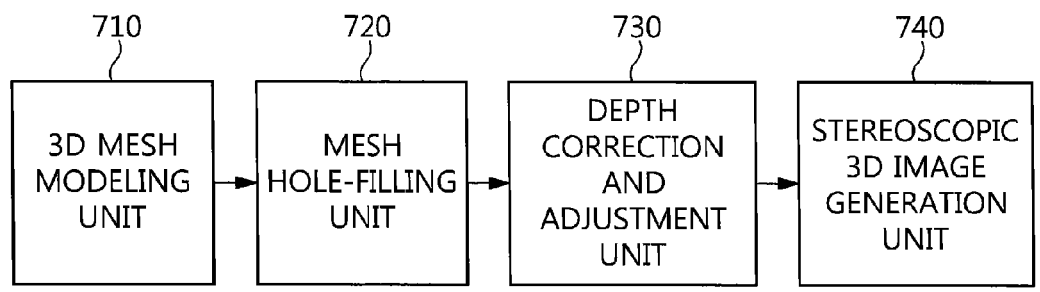
FIG. 7 is a block diagram showing an example of a 3D image generation unit shown in FIG. 3.

FIG. 7 is a block diagram showing an example of the 3D image generation unit shown in FIG. 3.

Referring to FIG. 7, the 3D image generation unit 330 shown in FIG. 3 includes a 3D mesh modeling unit 710, a mesh hole-filling unit 720, a depth correction and adjustment unit 730, and a stereoscopic 3D image generation unit 740.

The 3D mesh modeling unit 710 performs 3D mesh modeling.

The mesh hole-filling unit 720 performs mesh hole-filling.

The depth correction and adjustment unit 730 provides a 3D test image to each teleconference participant, measures the perceived 3D depth of the participant based on the participant's reaction to the provided 3D test image, and performs depth correction using the perceived 3D depth.

The stereoscopic 3D image generation unit 740 finally generates a 3D image composed of two color images to be displayed on a display device.

In this case, the display device may be a large-scale display, a household 3D television (3DTV), a 3D monitor for computers, or a mobile device.

Figure 8:
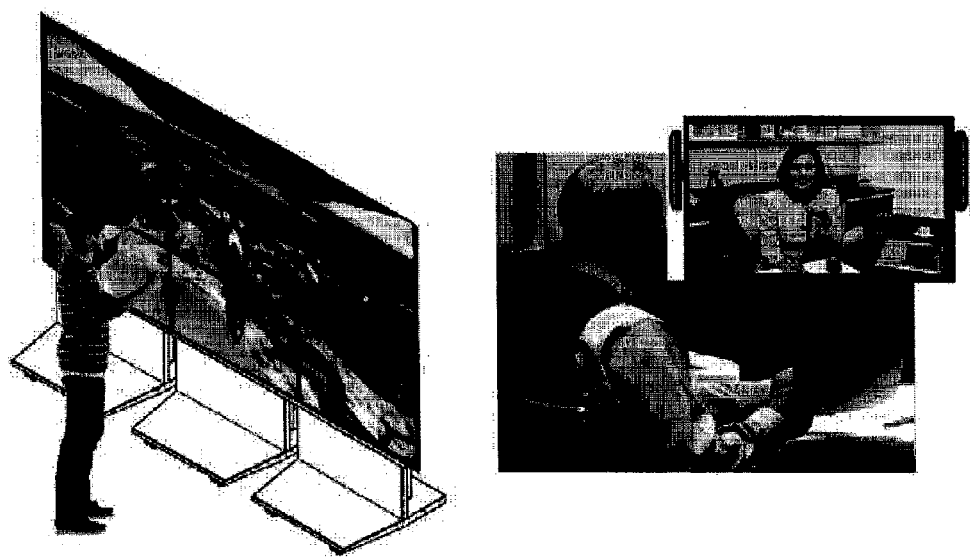
FIG. 8 is a diagram showing the progress of a 3D teleconference to which the present invention is applied.

FIG. 8 is a diagram showing the progress of a 3D teleconference to which the present invention is applied.

Referring to FIG. 8, each participant joining a teleconference makes eye contact with the counterpart involved in the teleconference while viewing images of the counterpart provided in three dimensions on a display screen. Images of the participant are captured by a camera that tracks the suitable location of the participant, and the captured images are synthesized into a full face image, and the full face image is transferred to the counterpart.

During the teleconference, the teleconference participant can perform interaction, such as giving high-fives to or shaking hands with the counterpart, and can manipulate virtual objects by conducting actions corresponding to preset patterns.

Figure 9:
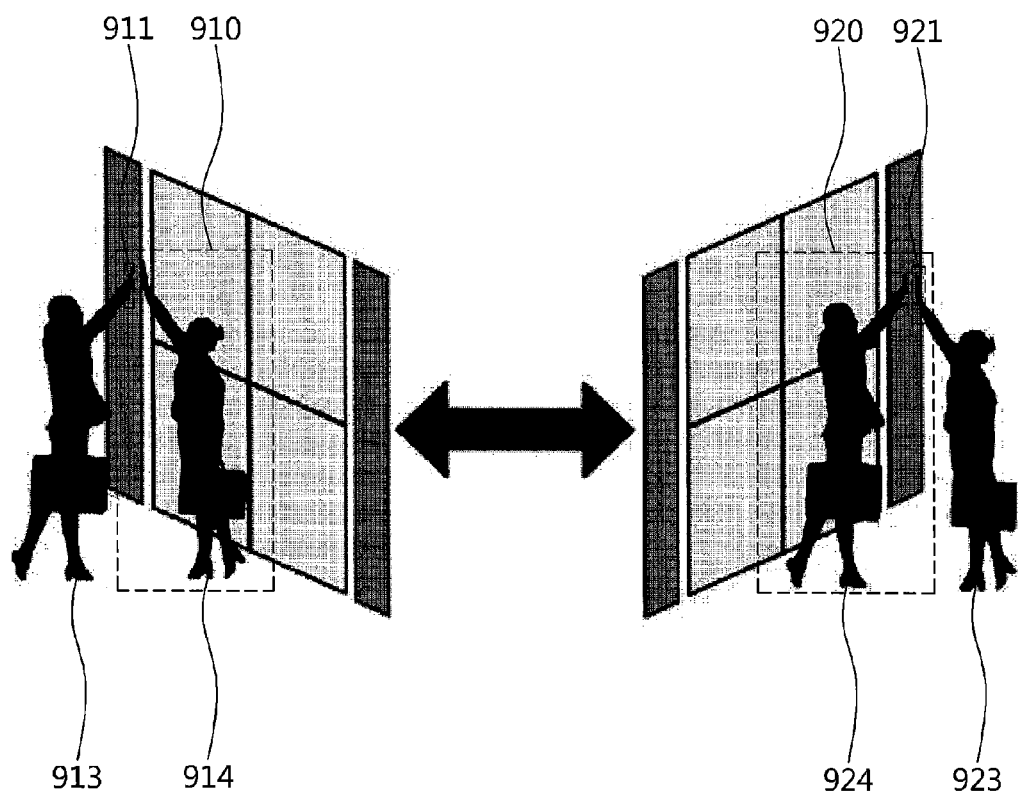
FIG. 9 is a diagram showing an example of visual feedback for an interactive action according to the present invention.

FIG. 9 is a diagram showing an example of a visual feedback for an interactive action according to the present invention.

Referring to FIG. 9, a teleconference participant 913 can enter an interactive action mode by conducting an action corresponding to a preset pattern during the teleconference with the counterpart 914 involved in the teleconference.

In the example shown in FIG. 9, the teleconference participant 913 can enter an interactive action mode for giving high-fives by conducting an action of raising his or her hand so that the palm faces a screen ready to give high-fives. The 3D teleconferencing apparatus enabling eye contact can enter the interactive action mode for giving high-fives by sensing the action of the participant 913.

In this case, on the display device, a 3D image 910 corresponding to the counterpart 914 involved in the teleconference can be displayed, and a visual feedback corresponding to the interactive action for giving high-fives can be included and displayed in the 3D image 910. Here, the visual feedback may be an image indicating a part of the hand 911 of the teleconference participant 913 raised and ready to give high-fives.

In this case, even on the side of the counterpart involved in the teleconference, an image corresponding to the interactive action mode for giving high-fives is displayed. That is, on the side of a counterpart 923 involved in the teleconference, a 3D image 924 corresponding to a teleconference participant 924 is displayed, and a visual feedback corresponding to an interactive action for giving high-fives can be included and displayed in the 3D image 924. In this case, the visual feedback may be an image indicating a part of the hand 921 of the counterpart 923 involved in the teleconference raised and ready to give high-fives.

Figure 10:
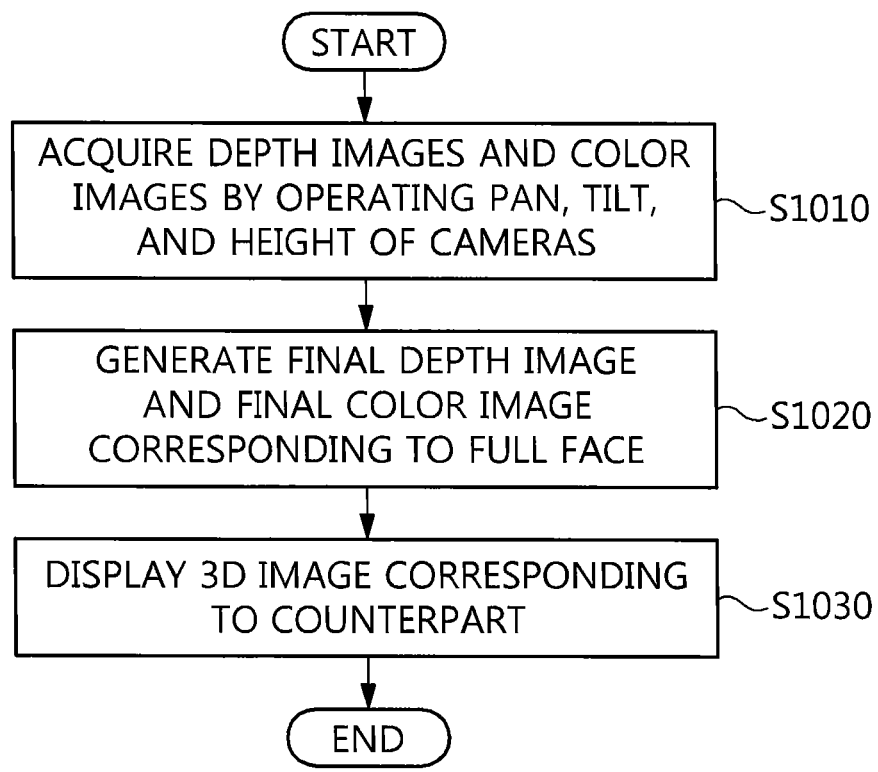
FIG. 10 is an operating flowchart showing a 3D teleconferencing method enabling eye contact according to an embodiment of the present invention.

FIG. 10 is an operating flowchart showing a 3D teleconferencing method enabling eye contact according to an embodiment of the present invention.

Referring to FIG. 10, a 3D teleconferencing method enabling eye contact according to an embodiment of the present invention acquires depth images and color images by operating the pan, tilt, and height of cameras in real time in consideration of images obtained by capturing a subject, that is, a teleconference participant, and images received over a network and corresponding to a counterpart involved in the teleconference at step S1010.

In this case, step S1010 may be configured to perform the pan operation of the cameras based on the positions of the eyes of the participant detected from the captured images, perform the tilt operation of the cameras based on a difference between the positions of the eyes of the participant and the positions of the eyes of the counterpart detected from the images corresponding to the counterpart, and perform the height operation of the cameras based on the eye level of the counterpart.

Further, the 3D teleconferencing method enabling eye contact according to the embodiment of the present invention generates a final depth image and a final color image corresponding to the full face of the participant for eye contact using the depth images and the color images at step S1020.

Furthermore, the 3D teleconferencing method enabling eye contact according to the embodiment of the present invention generates a 3D image corresponding to the counterpart and displays the 3D image on the display device at step S1030.

In this case, step S1030 may be configured to measure perceived 3D depth of the participant based on the reaction of the participant to a 3D test image provided to the teleconference participant, and generate a 3D image in consideration of the perceived 3D depth.

Although not shown in FIG. 10, the 3D teleconferencing method enabling eye contact according to the embodiment of the present invention may further include the step of determining whether the participant has conducted a preset action, using the captured images; and the step of performing a function corresponding to the preset action.

In this case, the step of performing the function corresponding to the preset action may be configured such that, if it is determined that the preset action is an interactive action, a visual feedback in which an image indicating a part of the body of the participant corresponding to the interactive action is added to the 3D image can be provided.

As described above, in the 3D teleconferencing apparatus and method according to the present invention, the configurations and schemes in the above-described embodiments are not limitedly applied, and some or all of the above embodiments can be selectively combined and configured so that various modifications are possible.

The invention claimed is:

1. A three-dimensional (3D) teleconferencing apparatus enabling eye contact, comprising:
    an image acquisition unit for acquiring depth images and color images by manipulating cameras in real time in consideration of images obtained by capturing a subject that is a teleconference participant and images received over a network and corresponding to a counterpart involved in the teleconference;
    a full face generation unit for generating a final depth image and a final color image corresponding to a full face of the participant for eye contact using the depth images and the color images;
    a 3D image generation unit for generating a 3D image corresponding to the counterpart and displaying the 3D image on a display device;
    wherein the image acquisition unit manipulates the cameras in real time by means of a pan operation of horizontally rotating the individual cameras in left/right directions, a tilt operation of vertically rotating the individual cameras in up/down directions, and a height operation of vertically moving the individual cameras in up/down directions; and
    wherein the image acquisition unit is configured to:
        perform the pan operation of the cameras based on the captured images,
        perform the tilt operation of the cameras using both the captured images and the images of the counterpart, and
        perform the height operation of the cameras based on the images of the counterpart; and
    wherein the image acquisition unit is configured to:
        perform the an operation of the cameras based on positions of eyes of the participant detected from the captured images,
        perform the tilt operation of the cameras based on a difference between the positions of the eyes of the participant and positions of eyes of the counterpart detected in the images of the counterpart, and
        perform the height operation of the cameras based on an eye level of the counterpart.

2. The 3D teleconferencing apparatus of claim 1, further comprising:
    a gesture recognition unit for determining whether the participant has conducted a preset action, using the captured images; and
    a gesture processing unit for performing a function corresponding to the preset action.

3. The 3D teleconferencing apparatus of claim 2, wherein the gesture processing unit is configured to, if the preset action is determined to be an interactive action, provide an interactive feedback including an image of the counterpart and a part of a body of the participant to indicate the interactive action through the display device.

4. The 3D teleconferencing apparatus of claim 3, wherein the interactive feedback is a visual feedback in which an image indicating a part of a body of the participant corresponding to the interactive action is added to the 3D image.

5. The 3D teleconferencing apparatus of claim 4, wherein the 3D image generation unit measures a perceived 3D depth of the participant based on a reaction of the participant to a 3D test image provided to the participant, and generates the 3D image in consideration of the perceived 3D depth.

6. The 3D teleconferencing apparatus of claim 1, wherein the cameras are provided to be integrated into the display device.

7. The 3D teleconferencing apparatus of claim 1, wherein the cameras are independently provided outside the display device.

8. The 3D teleconferencing apparatus of claim 1, wherein the full face generation unit performs depth noise elimination and depth correction on the depth images, performs color correction on the color images, and then generates a single final depth image and a single final color image.

9. The 3D teleconferencing apparatus of claim 1, wherein the 3D image generation unit reconstructs a 3D mesh image corresponding to the counterpart by performing mesh hole-filling on the final depth image and the final color image corresponding to the counterpart, and generates a 3D image corresponding to the counterpart by using the 3D mesh image.

10. A three-dimensional (3D) teleconferencing method enabling eye contact, comprising:
    acquiring depth images and color images by manipulating pan, tilt, and height of cameras in real time in consideration of images obtained by capturing a subject that is a teleconference participant and images received over a network and corresponding to a counterpart involved in the teleconference;
    generating a final depth image and a final color image corresponding to a full face of the participant for eye contact using the depth images and the color images;
    generating a 3D image corresponding to the counterpart and displaying the 3D image on a display device;
    wherein the image acquisition unit manipulates the cameras in real time by means of a pan operation of horizontally rotating the individual cameras in left/right directions, a tilt operation of vertically rotating the individual cameras in up/down directions, and a height operation of vertically moving the individual cameras in up/down directions; and
    Wherein acquiring the image is configured to:
    perform the an operation of the cameras based on the captured images perform the tilt operation of the cameras using both the captured images and the images of the counterpart, and perform the height operation of the cameras based on the images of the counterpart; and
    wherein acquiring the depth images and the color images is configured to: perform the pan operation of the cameras based on positions of eyes of the participant detected from the captured images, perform the tilt operation of the cameras based on a difference between the positions of the eyes of the participant and positions of eyes of the counterpart detected in the images of the counterpart, and perform the height operation of the cameras based on an eye level of the counterpart.

11. The 3D teleconferencing method of claim 10, further comprising:
    determining whether the participant has conducted a preset action, using the captured images; and
    performing a function corresponding to the preset action.

12. The 3D teleconferencing method of claim 11, wherein performing the function corresponding to the preset action is configured to, if the preset action is determined to be an interactive action, provide a visual feedback including an image of the counterpart and a part of a body of the participant to indicate the interactive action through the display device.

13. The 3D teleconferencing method of claim 12, wherein displaying on the display device is configured to measure a perceived 3D depth of the participant based on a reaction of the participant to a 3D test image provided to the participant, and generate the 3D image in consideration of the perceived 3D depth.

* * * * *